United States Patent [19]

Matsuoka et al.

[11] Patent Number: 4,729,641
[45] Date of Patent: Mar. 8, 1988

[54] FUNCTIONAL OPTICAL ELEMENT HAVING A NON-FLAT PLANAR INTERFACE WITH VARIABLE-INDEX MEDIUM

[75] Inventors: Kazuhiko Matsuoka; Kazuo Minoura; Masayuki Usui, all of Yokohama; Yukuo Nishimura, Sagamihara; Takeshi Baba, Yokohama; Atsushi Someya, Machida; Yuko Suga; Kazuyo Matsumoto, both of Yokohama, all of Japan

[73] Assignee: Canon Kabushiki Kaisha, Tokyo, Japan

[21] Appl. No.: 45,184

[22] Filed: Apr. 30, 1987

Related U.S. Application Data

[63] Continuation of Ser. No. 616,706, Jun. 4, 1984, abandoned.

[30] Foreign Application Priority Data

Jun. 10, 1983 [JP] Japan ................. 58-103729
Oct. 7, 1983 [JP] Japan ................. 58-187857
Oct. 7, 1983 [JP] Japan ................. 58-187858

[51] Int. Cl.[4] .................................... G02F 1/13
[52] U.S. Cl. ........................ 350/348; 350/162.24; 350/355; 350/347 V; 350/351; 350/96.19
[58] Field of Search ............ 350/162.22, 162.24, 350/355, 356, 334, 347 V, 339 R, 348, 351, 96.17, 96.19, 96.15

[56] References Cited

U.S. PATENT DOCUMENTS 4,048,358 9/1977 Shanks ..................... 350/351 X
4,251,137 2/1981 Knop et al. .............. 350/347 V
4,564,267 1/1986 Nishimoto ................ 350/379

FOREIGN PATENT DOCUMENTS 53-3928 10/1974 Japan .

OTHER PUBLICATIONS

Aviram, A. et al., "Optically Illiminating and Electrically and Thermally Addressing a LCD," *IBM Technical Disclosure Bulletin*, (Apr. 1979) pp. 4724–4726.

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

A functional optical element comprises a first optical member, a second optical member provided in contact with said first optical member, the interface between said first optical member and said second optical member being non-flat planar, a means for changing the refractive index of said second optical member, said means for changing refractive index being capable of creating selectively a first state in which said first optical member and said second optical member have an equal refractive index and a second state in which said first optical member and said second optical member have different refractive indices by changing the refractive index of said second optical member.

9 Claims, 15 Drawing Figures

U.S. Patent  Mar. 8, 1988  Sheet 1 of 6  4,729,641
FIG. 1
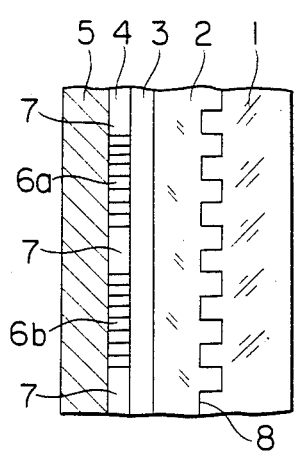
FIG. 2
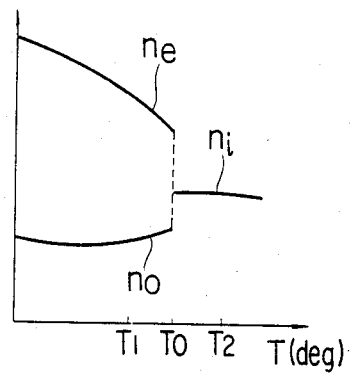
FIG. 3
FIG. 4
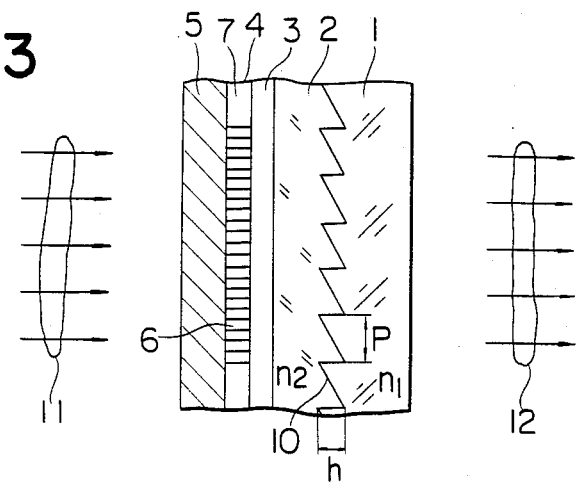
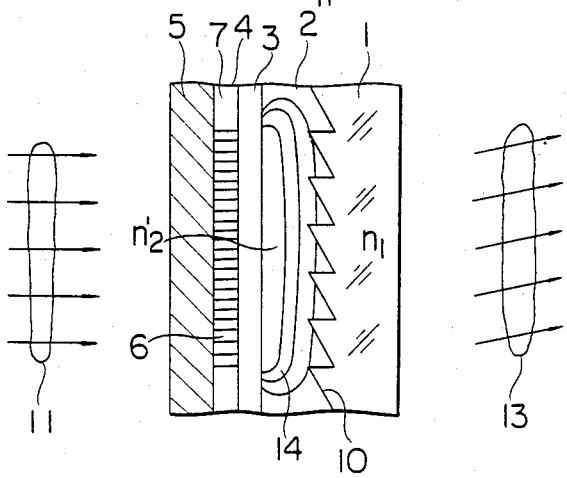

FUNCTIONAL OPTICAL ELEMENT HAVING A NON-FLAT PLANAR INTERFACE WITH VARIABLE-INDEX MEDIUM

This application is a continuation of application Ser. No. 616,706 filed June 4, 1984, now abandoned.

BACKGROUND OF THE INVENTION

1. Field of the Invention

This invention relates to an optical element suitable for devices for optical recording, devices for optical display, devices for optical image formation, devices for optical communication, etc.

2. Description of the Prior Art

Various kinds of systems and devices have been proposed having functions such as modulation, deflection or image formation of light flux. For example, a system has been proposed, in which physical changes are generated locally within a medium and the light flux passing through the medium is modulated by the physical changes. For example, Japanese laid-open patent No. 5523/1981 (U.S. Pat. No. 4,281,904) discloses a method for optical modulation, in which an electrical field is applied locally in a crystal comprising an electrooptical material to change the refractive index of the medium at the portion where this electrical field is applied. Also, Japanese patent application No. 128566/1982 (U.S. patent application Ser. No. 516,267, now abandoned) filed by the applicant of the present invention discloses a method for modulating light flux by use of vapor bubbles generated locally in a liquid. Similarly, Japanese patent application No. 179265/1982 (U.S. patent application Ser. No. 539,675, abandoned in favor of continuation application Ser. No. 902,074) discloses a method for modulating light flux by generating a refractive index distribution by locally heating a liquid.

SUMMARY OF THE INVENTION

An object of the present invention is to provide an optical element having a high function which can be used as mentioned above.

Another object of the present invention is to provide an optical element of a compact size and a simple constitution, having a high function.

Still another object of the present invention is to provide a functional optical element capable of controlling light flux at a high speed and easy in handling.

According to the present invention, there is provided a functional optical element comprising a first optical member, a second optical member provided in contact with said first optical member, the interface between said first optical member and said second optical member being non-flat planar, a means for changing the refractive index of said second optical member, said means for changing refractive index being capable of creating selectively a first state in which said first optical member and said second optical member have an equal refractive index and a second state in which said first optical member and said second optical member have different refractive indices by changing the refractive index of said second optical member.

BRIEF DESCRIPTION OF THE DRAWINGS

FIG. 1 shows a schematic sectional view of an embodiment of the functional optical element according to the present invention;

FIG. 2 is a graph showing the refractive index change on phase transition of a liquid crystal by heat;

FIG. 3, FIG. 4, FIG. 5, FIG. 6, FIG. 7, FIG. 8 and FIG. 9 each is a schematic sectional view of the functional optical element according to the present invention;

DETAILED DESCRIPTION OF THE PREFERRED EMBODIMENTS

Figure 5:
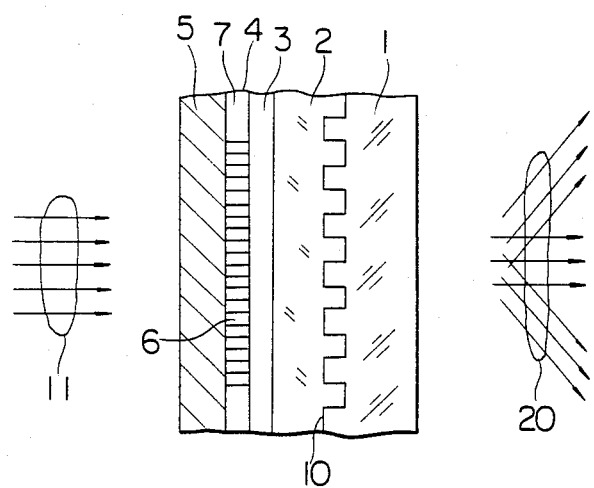

In the functional optical element according to the present invention, a first optical member and a second optical member are contacted with each other to form a non-flat planar interface between these members, and at least one of the aforesaid optical members is constituted so as to be variable in refractive index by an external influence. And, by changing the relationship between the refractive indices of said first optical member and said second optical member in the second state where at least one of the optical members is changed in refractive index relative to the relationship between the indices of said first optical member and second optical member, various influences are incurred on the light flux incident upon said interface. In the present invention, the fact that the interface is non-flat planar means that the interface is not one plane and therefore the interface has a concavo-convex shape. By imparting such a concavo-convex shape, the optical element can be endowed with various optical functions corresponding to the shape of the interface, when there is created a refractive index difference between the members on both sides of the interface. As the influence from outside, there may be included application of electrical field, magnetic field, heat, pressure, etc. Thus, by applying electrical field, magnetic field, heat, pressure, etc. on at least one of the optical members, the refractive index of the optical member can be changed to change the state of the light flux passing through said member as caused by the interface consisting of the above concavo-convex structure.

In the functional optical element according to the present invention, it is desirable to set the refractive index of the first optical member equal to that of the second optical member in the aforesaid first state or second state. In this case, in either one of the states, the incident light flux is emitted from the optical element without receiving any influence at the interface between the first optical member and the second optical member.

In the functional optical element according to the present invention, the above concavo-convex structure of the interface is formed by a plurality of flat planes or curved planes, and examples of the optical pattern to be provided at the interface may include various patterns such as diffraction grating, zone plate, prism, lens, diffusing surface, etc.

In the functional optical element according to the present invention, the state of the first and second optical members is constituted such that both solids are contacted with each other, that both solids are bonded with each other with an adhesive, that the other medium is vapor deposited on one of the media, that both media are formed by vapor deposition or that a solid and a liquid or a solid and a liquid crystal are contacted with each other.

In the functional optical element according to the present invention, the aforesaid first and second members employed can be changed in refractive index without changing their shapes. Accordingly, even when the refractive index may be changed, the shape of the interface will not be changed.

In the following detailed description of the present invention with reference to the drawings, a device of the type which functions through the changes in refractive index in the medium by heat is illustrated. Needless to say, the present invention is not restricted to such a type, but it is also applicable for optical elements of the type disclosed in the above Japanese laid-open patent No. 5523/1981 (U.S. Pat. No. 4,281,904), the type disclosed in Japanese patent application No. 128566/1982 (U.S. patent application Ser. No. 516,267), other various types or combination of these types.

FIG. 1 shows an embodiment of the optical element according to the present invention. In FIG. 1, 1 is a first optical member, 2 is a second optical member, 3 is an insulator having thermal conductivity, 4 is a heat-generating resistor layer comprising heat-generating resistors ($6a$, $6b$, ...) and insulators 7 provided for insulation between the heat-generating resistors, when such heat-generating resistors are provided in plural number, and 5 is a support. When the optical element is used as the transmissive type, the first optical member 1, the second optical member 2, the thermally conductive insulator 3, the heat-generating resistors ($6a$, $6b$, ...), the insulator 7 and the support 5 are required to be transparent at the wavelength region to be employed. For example, the insulators 3 and 7 may be made of $SiO_2$. For the heat-generating resistors 6, indium oxide ($In_2O_3$), tin oxide ($SnO_2$) and a mixture thereof, which is the material for the transparent electrode not shown, mixed in an appropriate amount with zinc oxide ($ZnO_2$), chromium oxide ($Cr_2O_3$), antimony oxide ($Sb_2O_3$), may be used. What is important is that, irrespective of whether the heat-generating resistor 6 generater heat or not, the materials and the compositions should be controlled so that the refractive indices of the heat-generating resistor 6 and the insulator 7 in the heat-generating resistor layer 4 may be substantially equal (index matching). The first optical member 1 is, for example, an optical glass and a concavo-convex relief structure is engraved at the interface 8 with the second optical member 2. The second optical member 2 is, for example, a light-transmissive liquid. Under a first temperature state, for example, at room temperature, it is desirable that the refractive indices of the first optical member and the second optical member should be maintained substantially under index-matched state. For this purpose, the light-transmissive liquid of the second optical member 2 can be constituted of a mixture of plural kinds of liquids with different refractive indices to effect the above index-matching.

Still more important is formation of a state where no index-matching is created between the above optical members 1 and 2, under a second temperature state which is created by heating or cooling the optical members 1 and 2 from outside. At that time, the relief structure of concavo-convex shape provided at the interface 8 between the optical member 1 and the optical member 2 permits the device to have an optical function through difference in refractive index between the members forming the interface. As a technique for this purpose, it is possible to use materials with different temperature dependence of refractive index ($\partial n/\partial T$) for the above first optical member 1 and the second optical member 2, respectively. In general, optical glasses have an absolute value of $\partial n/\partial T$ on the order of approximately $10^{-6}$ (/deg), while that of a liquid on the order of approximately $10^{-4}$ (/deg). Examples of liquid materials may include water; alkyl alcohols having 1 to 4 carbon atoms such as methanol, ethanol, n-propyl alcohol, isopropyl alcohol, etc.; amides such as dimethylformamide, dimethylacetamide, etc.; amines such as triethanolamine, diethanolamine, etc.; ketones or ketoalcohols such as acetone, diacetone alcohol, etc.; ethers such as tetrahydrofuran, dioxane, etc.; polyalkylene glycols such as polyethylene glycol, polypropylene glycol, etc.; alkylene glycols of which alkylene moiety contains 2 to 6 carbon atoms such as ethylene glycol, propylene glycol, hexylene glycol, etc.; glycerol; lower alkyl ethers of polyhydric alcohols such as ethyleneglycol methyl ether, triethyleneglycol monomethyl (or ethyl) ether, etc.; liquid crystals; and so on. When a liquid crystal is used for the optical member, it is necessary to align the oriented state of the liquid crystal and polarized state of the incident light in a certain direction.

Other materials for optical members 1 and 2 than those as mentioned above may include optical crystals such as NaCl, KCl, $CaF_2$, $SiO_2$, etc. (each having $\partial n/\partial T$ on the order of ca. $10^{-6}$–$10^{-8}$) and plastic materials for optical materials such as polystyrene, PMMA, polycarbonate, 2-methylcyclohexyl methacrylate, allyldiglycol carbonate, polyallyl methacrylate, acrylonitrile-styrene copolymer, polydiallyl phthalate and the like ($\partial n/\partial T$ is on the order of ca. $10^{-4}$).

Still another technique for making the refractive indices of the optical member 1 and the optical member 2 in the second temperature state as described above is to utilize the refractive index change of the medium on phase transition as can be seen in liquid crystals. As shown in FIG. 2, among the liquid crystals, some exhibit a critical phase transition temperature $T_0$, being in a nematic liquid crystal phase having an ordinary ray refractive index of $n_o$ and an extraordinary ray refractive index $n_e$ at a temperature $T_1$ lower than $T_0$, but in a liquid phase by phase transition having a refractive index $n_l$ at a temperature $T_2$ higher than $T_0$. Specific examples of compounds and their phase transition temperatures $T_0$ are shown below.

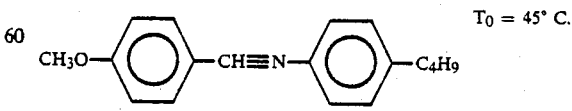

$T_0 = 45°$ C.

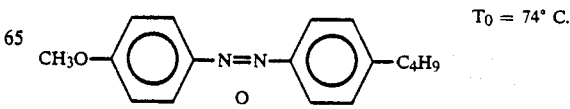

$T_0 = 74°$ C.

-continued

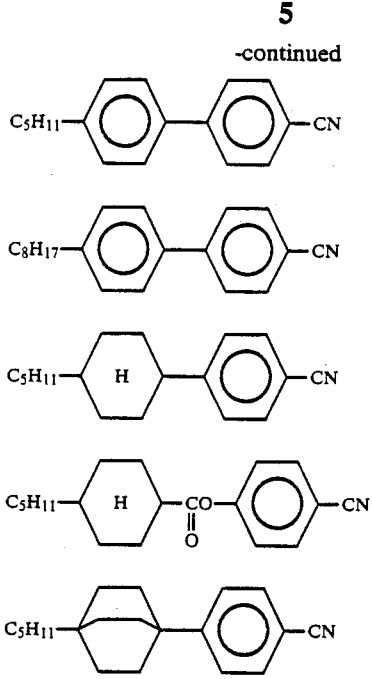

$T_0 = 35°$ C.

$T_0 = 39.5°$ C.

$T_0 = 55°$ C.

$T_0 = 79°$ C.

$T_0 = 100°$ C.

By utilizing such a refractive index change on phase transition by application of heat, for example, by use of an optical glass for the first optical member 1 and a liquid crystal for the second optical member 2, with an index-matching between the refractive index $n_o$ or $n_e$ of the liquid crystal phase and that of the optical glass under the first temperature state $T_1$, and utilizing the refractive index difference between the refractive index $n_i$ during the liquid phase of the second optical member 2 and that of the above optical glass under the second temperature state $T_2$ by heating, it is possible to create an optical function in the concavo-convex relief structure previously engraved at the interface 8 between the both members. As mentioned above, when employing a liquid crystal for the optical member, it is necessary to align the oriented state and the polarized state of the incident light to a certain direction.

In the above explanation, index-matching is done between the refractive index of the liquid crystal phase and that of the optical glass under the first temperature state. As mentioned previously, index-matching is not an indispensable means but it is used for convenience of explanation. Thus, presence of a difference in refractive index is permissible. What is important is that the refractive index difference under the first temperature state $T_1$ should be different from the refractive index difference under the second temperature state $T_2$. The situation is the same in the following explanation when a state applied with index-matching is employed.

FIG. 3 and FIG. 4 show an embodiment of the functional optical element according to the present invention, and the members common to those shown in FIG. 1 employ the same symbols.

FIG. 3 shows the first temperature state, and the interface 10 between the first optical member 1 having a refractive index of $n_1$ and the second optical member 2 having a refractive index $n_2$ (in the first temperature state, index-matching of $n_2 = n_1$ is done) is engraved with a blazed type diffraction grating with a pitch P and a concavo-convex amount h. Under the first temperature state, no heat generation occurs in the heat-generating resistor 6, and therefore the incident light flux 11 transmits through the device as emitted light flux 12 without receiving any change.

FIG. 4 shows the second temperature state created by generating heat at the heat-generating resistor 6. In FIG. 4, the internal refractive index of the second optical member 2 becomes $n_2'$ ($\neq n_2$) by use of a member with a relatively large $\partial n/\partial T$ absolute value therefor, while the internal refractive index $n_1$ of the first optical member 1 is not substantially changed by use of a member with a relatively small $\partial n/\partial T$ absolute value therefor. Accordingly, the interface 10 has the function of a blazed type diffraction grating formed on both sides of optical members having refractive indices $n_2'$ and $n_1$ ($n_2' \neq n_1$) When the concavo-convex amount h of the diffraction grating is smaller as compared with the pitch P, the diffraction efficiency $\gamma(m)$ of the m-order diffraction light can be calculated approximately from the following equation:

$$\gamma(m) = (1 - R) \times \left\{ \frac{\text{SIN}\left(m\pi - \frac{\alpha}{2}\right)}{\left(m\pi - \frac{\alpha}{2}\right)} \right\}^2 \quad (1)$$

wherein $m = 0, \pm 1, \pm 2, \pm 3, \ldots$.

$$\alpha = 2\pi \cdot h \cdot (n_2' - n_1)/\lambda \quad (2)$$

and R is the reflectance at the diffraction grating surface.

Thus, as apparently seen from the equation (1), by controlling $\alpha$, the diffraction efficiency of a specific $m_o$-order diffraction light can be selectively enhanced.

As can be understood from the above explanation, the interface 10 between the optical members 1 and 2 functions as the blazed type diffraction grating under the second temperature state, with the result that the incident light flux can be diffracted efficiently as the $m_o$-order diffracted light.

In order to create a good optical function in the second temperature state, it is desirable that the $n_2'$ of the optical member 2 should be formed substantially uniformly. For this purpose, it is necessary to take good care of the dimension and shape in the optical axis direction of the optical member, the dimension and shape of the heat-generating resistor 6 and choice of the material for the thermally conductive insulator 3.

Figure 6:
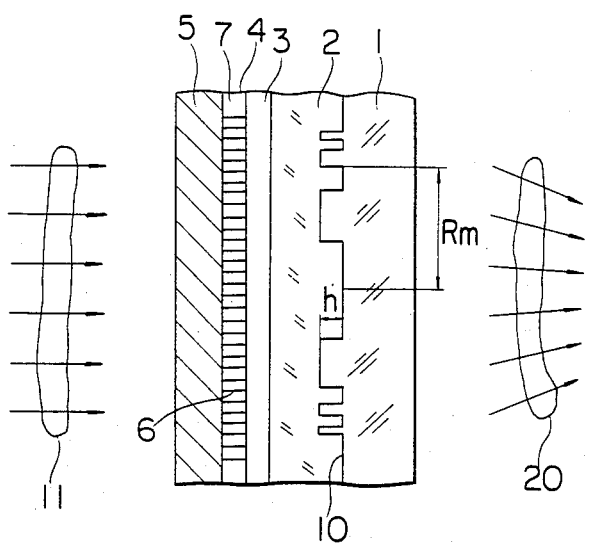

Still other examples of the concavo-convex relief structure engraved on the interface 10 between the optical members 1 and 2 are shown in FIG. 5 and FIG. 6. The interface 10 in FIG. 5 has equal pitch and equal depth of groove, and functions as the transmission type phase diffraction grating under the second temperature state. The interface 10 between the optical members 1 and 2 in FIG. 6 constitutes a phase type Fresnel zone plate. Now, the distance to the wall of the m'th groove measured from the center of the plate is defined as Rm and the focal length as f, then the following relation:

$$Rm = (m\lambda f)^{\frac{1}{2}} \quad (3)$$

should be satisfied, and further the depth h of the groove may be controlled so that the phase difference in optical path due to the concavo-convex relief structure may be $\pi$ under the second temperature state.

Figure 7:
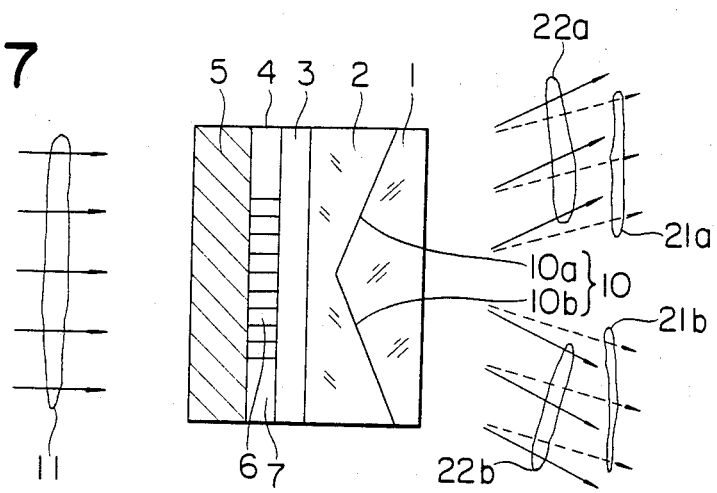

FIG. 7 shows still another embodiment of the functional optical element according to the present invention. The functional optical element shown in FIG. 7 has an interface 10 between the first optical member 1 and the second optical member 2, which is shaped in a prism constituted of the two planes 10a and 10b. In FIG. 7, when the heat-generating resistor 6 generates no heat, the incident light flux 11 is converted to the emitted light fluxes 21a and 21b corresponding to the incident angles relative to the planes 10a and 10b forming the interface and the difference in refractive index between the first optical member 1 and the second optical member 2. On the other hand, when the heat resistor 6 generates heat, the above refractive index difference is changed, whereby the incident light is converted to the emitted fluxes 22a and 22b with different angles from the above fluxes 21a and 21b. As described above, it is possible to apply a means of so called index-matching for respective members, which makes the refractive index difference between the optical members (1, 2) zero under a specific state.

Figure 8:
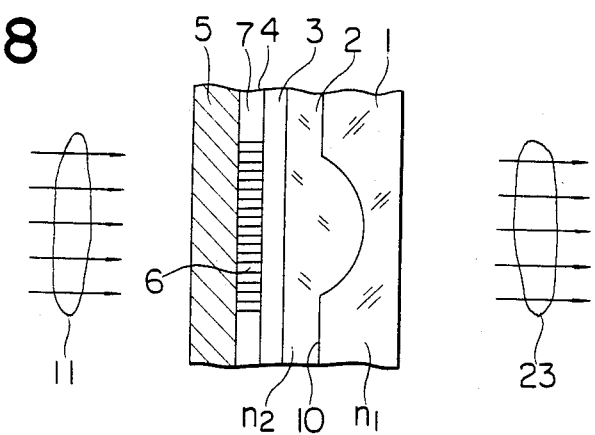
Figure 9:
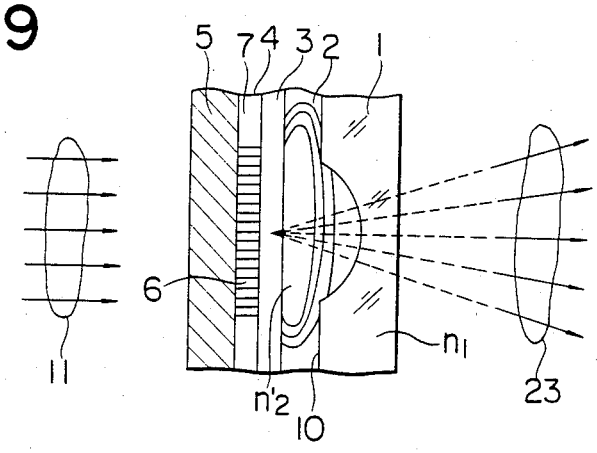

FIG. 8 and FIG. 9 show still another embodiment of the functional optical element according to the present invention, in which the same numerals are indicated for the same members as shown in FIG. 1. The functional optical element is an embodiment wherein the interface 10 is endowed with a lens action.

FIG. 8 shows a first temperature state, and a spherical surface with a curvature radius R is formed at the interface 10 between the first optical member 1 with a refractive index $n_1$ and the second optical member 2 with a refractive index $n_2$ (under the first temperature state, index-matching of $n_1 \approx n_2$ is done). Under the first temperature state, the heat-generating resistor 6 generates no heat and therefore the incident light flux 11 undergoes no change and transmits through the device as the emitted light flux 23.

FIG. 9 shows the second temperature state created by generating heat at the heat-generating resistor 6. In FIG. 9, the internal refractive index of the second optical member 2 becomes $n_2'$ ($\neq n_2$) by use of a member with a relatively large $\partial n/\partial T$ absolute value therefor, while the internal refractive index $n_1$ of the first optical member 1 is not substantially changed by use of a member with a relatively small $\partial n/\partial T$ absolute value therefor. Accordingly, the interface 10 has the function of a spherical lens formed on both sides of optical members with refractive indices $n_2'$ and $n_1$ ($n_2' \neq n_1$), respectively. The focal length f of said spherical lens can be represented as follows:

$$f = \frac{R}{n_1 - n_2'} \quad (4)$$

wherein $n_1$ is the refractive index of the first optical member at $T_2$, $n_2'$ is the refractive index of the second optical member at $T_2$ and R is the radius of curvature of the spherical lens.

Accordingly, as apparently seen from the equation (4), by generating heat at the heat-generating resistor 6, the interface 10 between the first optical member 1 and the second optical member 2 can function as a spherical lens with a focal length f, with the result that the incident light flux can be converted to a diverging or a converging light flux. If the temperature dependence ($\partial n_2/\partial T$) of the second optical member 2 is positive, $n_2'$ is greater than $n_1$, whereby in the example shown in FIG. 9, f is greater than zero and the emitted light flux becomes a converging light flux, thus creating the action of a convex lens. Conversely, if ($\partial n_2/\partial T$) is negative, the action of a concave lens will be created. Also, in the case of a concave lens, considering that the original point of light flux emission is the virtual image point, it follows that there occurs the action of image formation at one point in either case of convex lens and concave lens.

In order to create a good optical function in the second temperature state, it is desirable that the $n_2'$ of the optical member 2 should be formed substantially uniformly. For this purpose, it is necessary to take good care of the dimension and shape in the optical axis direction of the optical member, the dimension and shape of the heat-generating resistor 6 and choice of the material for the thermally conductive insulator 3.

In the functional optical element shown in FIG. 8 and FIG. 9, the distribution of refractive index is forced to be separated at the spherical lens formed at the interface between the first optical member and the second optical member as a boundary, whereby the refractive index can be maintained substantially uniformly within each optical member, whereby good image forming characteristic can be achieved similarly as in conventional spherical lens.

In this embodiment, the interface between the first optical member and the second optical member is made spherical, but various curved surfaces are available such as cylindrical surface, rotational symmetrical nonspherical surface, etc., provided that it is a smooth surface capable of giving an image forming action.

Next, examples of application of the functional optical element as described above for various devices are to be described.

Figure 10:
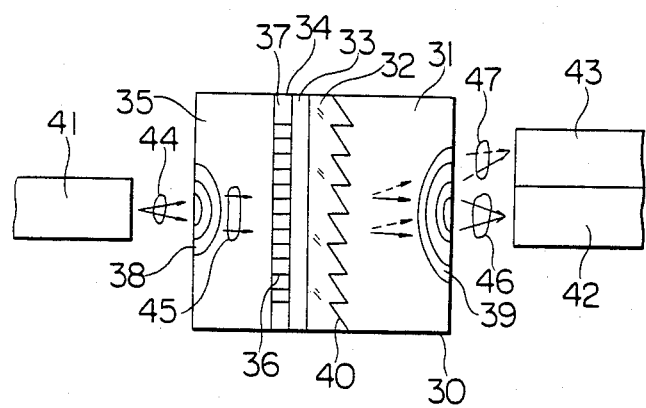
FIG. 10 is a schematic sectional view of the functional optical element according to the present invention when applied for a switching device.

FIG. 10 shows an example, in which the optical element shown in the embodiment in FIG. 3 and FIG. 4 is used as the optical path branching device. The optical element 30 according to the present invention is constituted basically the same as the optical element shown in FIG. 3, but differs in that the light flux emitting end of the first optical member 31 and the light flux incident end of the support 35 are provided with microlenses 39 and 38, respectively. Under the first temperature state, the light flux 44 from the fiber for incidence 41 is collimated by the above microlens 38 (light flux 45), passes through the heat-generating resistor layer 34 comprising the heat-generating resistor 36 and the insulator 37, then passes through the second optical member 32 and condensed by the microlens 39 provided at the end of the first optical member 31 to be made incident as the light flux 46 on the fiber 42 on the light receiving side. On the other hand, under the second temperature state applied with heat from the heat-generating resistor 36, the light flux 45 within the support is diffracted through the action of the diffraction grating consisting of the concavo-convex relief structure at the interface 40 and condensed by the microlens 39 to be made incident as the light flux 47 on still another fiber 43 on the light receiving side.

Figure 11:
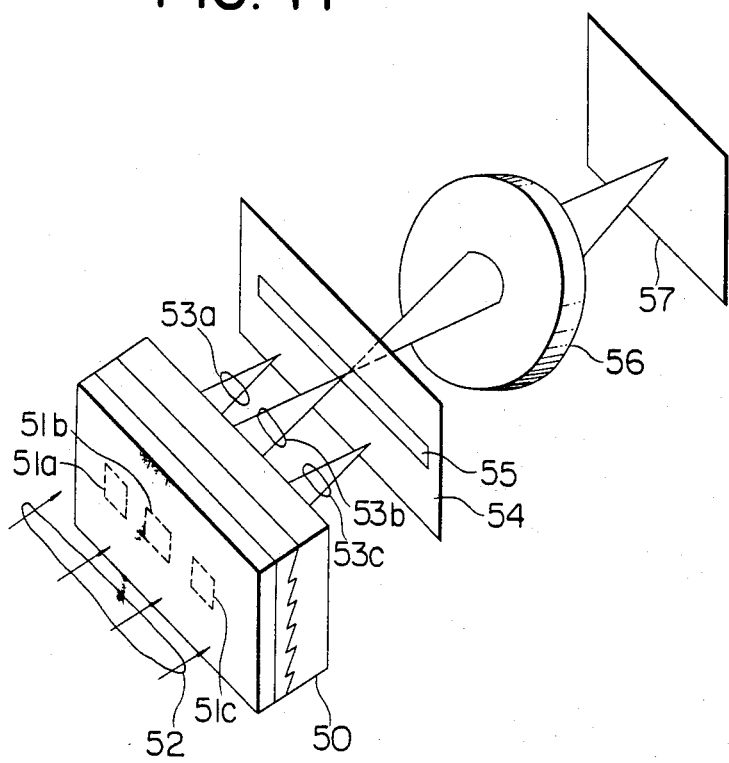
FIG. 11 is a schematic perspective view of the functional optical element according to the present invention when applied for a recording device.

FIG. 11 shows an example of application of the optical element shown in FIG. 3 and FIG. 4 for a device for recording and display. The optical element according to the present invention has internally a plurality of heat-generating resistors 51a, 51b and 51c. Now, considering the case that only the heat-generating resistor 51b is generating heat, of the light flux 52 incident on the above optical element 50, the fluxes passing in the vicinity of the heat-generating resistors 51a and 51c receive no action and form images on the light shielding filter 54 as the light fluxes 53a and 53c, respectively, by means of the microlens array (not shown) provided in one-to-one correspondence to the above heat-generating resistors 51a, 51b and 51c. On the other hand, the light flux passing in the vicinity of the heat-generating resistor 51b receives the diffracting action of the device to be diffracted and thereafter passes through the opening 55 provided on the light-shielding filter 54 as the light flux 53b and projected through a projecting lens 56 to form an image on the screen or a recording medium 57.

Figure 12:
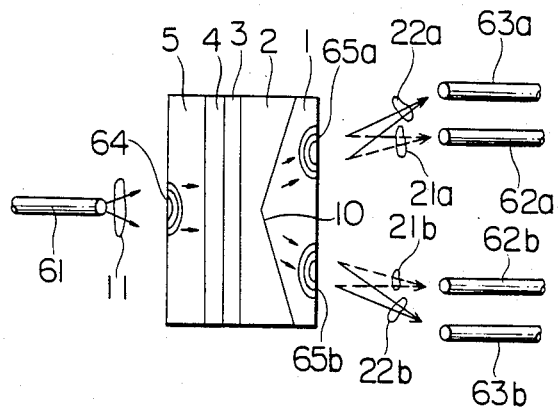
FIG. 12 is a schematic sectional view of the functional optical element according to the present invention when applied for a switching device.

FIG. 12 shows an example of application of the functional optical element as shown in FIG. 7 for an optical branching device capable of switching. In FIG. 12, the same members are shown by the same symbols as those used in FIG. 7. The light flux 11 from the optical fiber for incident light 61 is collimated by a flat plate microlens 64 provided on the support 5 of the optical element. This light flux is branched into two directions at the interface 10 based on the principle as described above. At that time, depending on presence or absence of heat generation at the heat-generating resistor layer 4, the image angle incident on the flat plate microlenses 65a and 65b provided on the first optical member 1 will differ. The above difference in image angle leads to the difference in image height during image formation by the flat plate microlenses 65a and 65b. Accordingly, the light flux passing through the device will become the emitted light fluxes 21a and 21b to be made incident on the optical fibers 62a and 62b on the emitting side during no heat generation, while it becomes the emitted light fluxes 22a and 22b to be made incident on the optical fibers 63a and 63b on the emitting side during heat generation.

In the above explanation with reference to FIG. 7, an example is shown, in which presence or absence of heat generation at the heat-generating resistor 4 appears as the difference in refracted angle of the light flux at the flat planes 10a and 10b constituting the boundary interface 10. It is also possible to employ the same assembly under a mode where the light flux is refracted or reflected totally depending on presence or absence of heat generation at the heat-generating resistor layer 4 by controlling the angles constituting the flat planes 10a and 10b.

Figure 13:
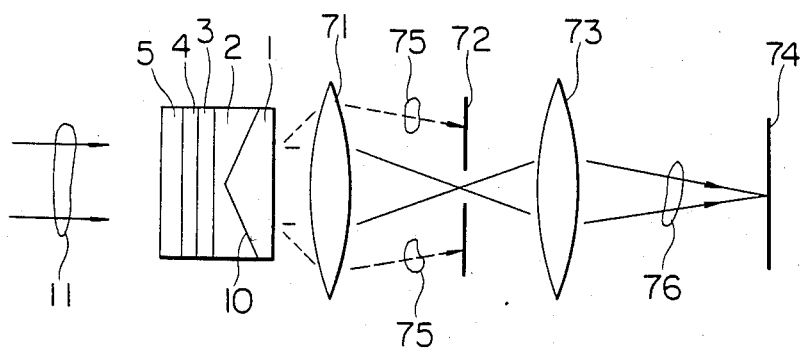
FIG. 13, FIG. 14 and FIG. 15 each is a schematic sectional view of the functional optical element according to the present invention when applied for an optical shutter device.

FIG. 13 shows similarly an example of the functional optical element as shown in FIG. 7 for an optical shutter device. In FIG. 13, 71 is a first projecting optical system, 72 is a light-shielding plate having an opening on the optical axis of the first projecting optical system provided in the vicinity of the focus of the first projecting optical system, 73 is a second projecting optical system, 74 is a light receiving medium provided at a position optically conjugated with the light-shielding plate 72 with respect to the second projecting optical system, 75 is a light flux having received an action of the device, 76 is a light flux having received no action of the device. The optical element shown in FIG. 13 should preferably have the first optical member 1 and the second optical member 2 having refractive index difference, which is made substantially zero, whereby the incident parallel light 11 receives no modulating action by the device during no heat generation at the heat-generating resistor layer 4, and reaches the light receiving medium 74 through the first projecting optical system 71, the light-shielding plate 72 and the second projecting optical system 73. On the other hand, during heat generation at the heat-generating resistor layer 4, the wave plane of the incident light 11 is deformed and further receives an action to be refracted in the direction departing from the optical axis of the image forming optical system 71 due to the diffractive index difference between the first optical member 1 and the second optical member 2 contacted at the boundary interface 10. Accordingly, of the modulated light flux 75, the proportion of the dose shielded by the shielding plate 72 can be increased, and the dose reaching the light receiving medium 74 can be made substantially zero.

Figure 14:
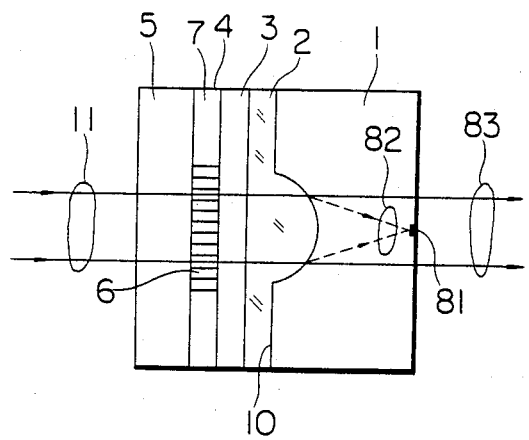

FIG. 14 shows another example of an optical shutter device in which the optical element as shown in FIG. 8 and FIG. 9 is employed. The functional optical element used in the device shown in FIG. 14 has a constitution basically the same as that of the optical element shown in FIG. 8, but differs in that the light flux emitting end of the first optical member is made coincident with the image forming position of the incident light flux under the second temperature state and that a light-shielding filter 81 for shielding the incident flux at said image forming position is provided. The incident parallel light 11, under the first temperature state, passes through the heat-generating resistor layer 4 consisting of heat-generating resistor 6 and the insulator 7, passes through the second optical member 2, then passes around the light-shielding filter 81 provided at end portion of the first optical member 1 and emitted as the light flux 83. On the other hand, under the second temperature state applied with heat from the heat-generating resistor 6, the parallel incident light flux receives an action of a lens comprising the spherical surface at the interface 10 to be condensed and all shielded by the above light-shielding filter 81.

Figure 15:
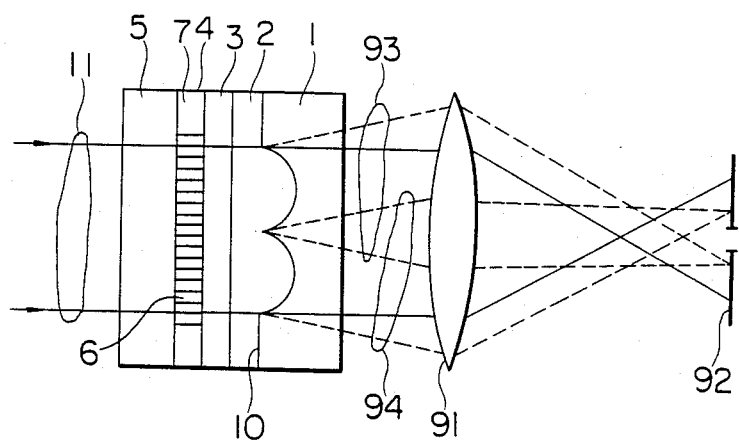

FIG. 15 shows another example of application of the optical element according to embodiment shown in FIG. 8 and FIG. 9 for an optical shutter device. The optical element to be used in the device shown in FIG. 15 has a constitution basically the same as that of the optical element shown in FIG. 8, but differs in that the interface between the first optical member 1 and the second optical member 2 is constituted with two adjacent spherical surfaces, that the action of the lenses at the interface is flux diverging action of a concave lens and that a convex lens 91 and a light-shielding plate having pinhole 92 are arranged behind the element. The parallel incident light 11, under the first temperature state, passes through the heat-generating resistor layer 4 consisting of the heat-generating resistor 6 and the insulator 7, then through the second optical member 2 and condensed by the convex lens 91 to pass through the pinhole of the light-shielding plate 92 arranged slightly behind the condensing position. On the other hand, under the second temperature state applied with heat from the heat-generating resistor 6, the parallel incident light flux 11 receives actions of the two spherical surfaces at the interface 10 to be emitted as the diverging light fluxes 93 and 94, condensed by the convex lens 91 at the positions around pinhole of hte light-shielding plate 92 to be shielded, whereby no light reach behind the light-shielding plate 92.

The optical shutter device as shown in FIG. 13, FIG. 14 and FIG. 15 can of course be applied widely for the optical recording device as shown in FIG. 11, the optical switching device as shown in FIG. 10 and further for optical display device, optical image forming device, and others.

As described above, the functional optical element of the present invention is constituted of a first optical member and a second optical member having a non-flat planar interface therebetween, and said optical element has the above both members with refractive indices subjected to index-matching or controlled to a certain value of refractive index difference under a first state and converted to a second state not satisfying the index-matching or different in refractive index difference from the first state by application of electrical field, magnetic field, heat, pressure, etc., thereby giving an optical action to the incident light flux caused by the optical pattern formed on the above interface.

What is claimed is:

1. A functional optical element comprising:
   a first optical member;
   a second optical member in contact with said first optical member, said first and second optical members having configurations that provide an interface comprising a blazed-type diffraction grating; and
   refractive index varying means for changing a refractive index of at least one of said first and second optical members, said refractive index varying means being capable of selectively creating a first state in which the refractive indices of said first and second optical members are equal and a second state in which the refractive indices of said first and second optical members are different.

2. A functional optical element according to claim 1, wherein said refractive index varying means comprises means for supplying heat.

3. A functional optical element according to claim 2, wherein at least one of said first optical member and said second member is formed of a liquid.

4. An optical apparatus comprising:
   a functional optical element having a first optical member, a second optical member in contact with said first optical member, said first and second optical members having configurations that provide an interface comprising a blased-type diffraction grating, and refractive index varying means for changing a refractive index of at least one of said first and second optical members, said refractive index varying means being capable of selectively creating a first state in which the refractive indices of said first and second optical members are equal and a second state in which the refractive indices of said first and second optical members are different;
   means for directing a light beam to said functional optical element; and
   optical means for selectively passing light beams emitted from said functional optical element in accordance with the state thereof.

5. An optical apparatus according to claim 4, wherein said optical means includes a shielding plate having a opening slit of predetermined shape.

6. An optical apparatus according to claim 4, wherein said functional optical element includes a microlens in the vicinity of a light emitting surface thereof.

7. A functional optical element comprising:
   a first optical member;
   a second optical member in contact with said first optical member, said first and second optical members having configurations that provide a non-planar interface therebetween;
   refractive index varying means for changing the refractive index of at least one of said first and second optical members; and
   lens means formed in the vicinity of a light transmitting surface, different from said interface, of at least one of said first and second optical members.

8. An optical apparatus comprising:
   a functional optical element having a first optical member and a second optical member in contact with said first optical member at an interface comprising a diffraction grating;
   refractive index varying means for changing a refractive index of at least one of said first and second optical members, said refractive index varying means being capable of selectively creating a first state in which the refractive indices of said first and second optical members are equal and a second state in which the refractive indices of said first and second optical members are different;
   directive means for directing a light beam to said functional optical element;
   first guiding means for guiding a light beam emitted from said functional optical element when said functional optical element is in said first state; and
   second guiding means for guiding a light beam emitted from said functional optical element when said functional optical element is in said second state.

9. An optical apparatus according to claim 8, wherein said diffraction grating comprises a blazed-type diffraction grating.

* * * * *

UNITED STATES PATENT AND TRADEMARK OFFICE
CERTIFICATE OF CORRECTION

PATENT NO. : 4,729,641
DATED : March 8, 1988
INVENTOR(S) : KAZUHIKO MATSUOKA, ET AL.

It is certified that error appears in the above-identified patent and that said Letters Patent is hereby corrected as shown below:

AT [75] IN THE INVENTORS

"Kazuyo Matsumoto," should read --Kazuya Matsumoto,--.

AT [56] IN THE REFERENCES

After "U.S. Patent Documents", insert
--3,743,507   7/1973   Chung Sen Ih et al. ..... 350/162.22X
  4,583,818   4/1986   Chen et al.         ..... 350/162.24X
  4,011,009   3/1977   Lama et al.         ..... 350/162.24X
  4,148,556   4/1979   Sauter et al.       ..... 350/96.19X
  4,571,024   2/1986   Husbands            ..... 350/96.19
  4,621,894  11/1986   Gouali              ..... 350/96.19--

COLUMN 3

Line 48, "generater" should read --generates--.

COLUMN 4

Lines 64-67,

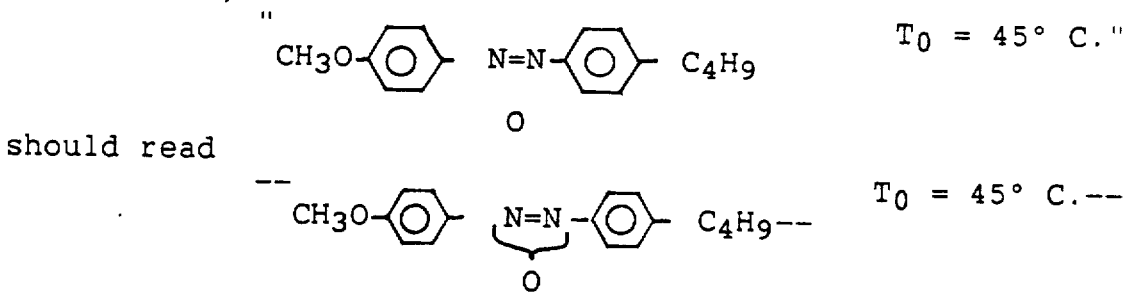

should read $T_0 = 45°$ C.--

UNITED STATES PATENT AND TRADEMARK OFFICE
CERTIFICATE OF CORRECTION

PATENT NO. : 4,729,641
DATED : March 8, 1988
INVENTOR(S) : KAZUHIKO MATSUOKA, ET AL.

It is certified that error appears in the above-identified patent and that said Letters Patent is hereby corrected as shown below:

COLUMN 5

Line 64, "$n_2=n_1$" should read --$n_2 \approx n_1$--.

COLUMN 8

Line 48, "condensed" should read --is condensed--.

COLUMN 9

Line 10, "projected" should read --is projected--.

COLUMN 10

Line 27, "emitted" should read --is emitted--.
Line 50, "condensed" should read --is condensed--.
Line 58, "hte" should read --the--.
Line 59, "reach" should read --reaches--.

COLUMN 11

Line 39, "blased-type" should read --blazed-type--.

UNITED STATES PATENT AND TRADEMARK OFFICE
CERTIFICATE OF CORRECTION

PATENT NO. : 4,729,641

DATED : March 8, 1988

INVENTOR(S) : KAZUHIKO MATSUOKA, ET AL.

It is certified that error appears in the above-identified patent and that said Letters Patent is hereby corrected as shown below:

COLUMN 12

Line 7, "a" (second occurrence) should read --an--.

Signed and Sealed this

Fourth Day of October, 1988

Attest:

DONALD J. QUIGG

Attesting Officer

Commissioner of Patents and Trademarks